(12) United States Patent
Selle et al.

(10) Patent No.: US 12,024,234 B2
(45) Date of Patent: Jul. 2, 2024

(54) TAILGATE ACCESSIBILITY

(71) Applicant: Magna Exteriors Inc., Aurora (CA)

(72) Inventors: Robert A. Selle, Rochester, MI (US);
Robert M. Horner, Ferndale, MI (US);
Larry R. Erickson, Birmingham, MI (US)

(73) Assignee: Magna Exteriors Inc., Aurora (CA)

( * ) Notice: Subject to any disclaimer, the term of this patent is extended or adjusted under 35 U.S.C. 154(b) by 0 days.

(21) Appl. No.: 18/191,649

(22) Filed: Mar. 28, 2023

(65) Prior Publication Data

US 2023/0249760 A1 Aug. 10, 2023

Related U.S. Application Data

(63) Continuation of application No. 17/178,642, filed on Feb. 18, 2021, now Pat. No. 11,639,201.

(60) Provisional application No. 62/978,089, filed on Feb. 18, 2020.

(51) Int. Cl.
*B62D 33/03* (2006.01)
*B60R 3/02* (2006.01)
*B62D 33/027* (2006.01)

(52) U.S. Cl.
CPC ............ *B62D 33/0273* (2013.01); *B60R 3/02* (2013.01); *B62D 33/03* (2013.01)

(58) Field of Classification Search
CPC ........ B62D 33/0273; B62D 33/03; B60R 3/02
USPC ............................................ 296/51, 57.1, 62
See application file for complete search history.

(56) References Cited

U.S. PATENT DOCUMENTS

| | | | |
|---|---|---|---|
| 1,605,693 | A | 11/1926 | Albertson |
| 1,836,377 | A | 12/1931 | Mahannah |
| 4,620,743 | A | 11/1986 | Eke |
| 5,104,172 | A | 4/1992 | Schildt |
| 5,123,692 | A | 6/1992 | Couvillion |
| 5,232,260 | A | 8/1993 | Lippard |
| 5,320,397 | A | 6/1994 | Peterson et al. |
| 5,630,637 | A | 5/1997 | Sauri |
| 5,992,918 | A | 11/1999 | Gobart et al. |
| 6,007,139 | A | 12/1999 | Shave |
| 6,053,554 | A | 4/2000 | Doniaz |
| 6,068,327 | A | 5/2000 | Junginger |
| 6,179,361 | B1 | 6/2001 | Sailors |
| 6,390,527 | B1 | 5/2002 | Leftridge |
| 6,588,822 | B1 | 7/2003 | Duvall, Jr. |
| 6,886,877 | B1 | 5/2005 | Plavetich et al. |
| 7,201,424 | B1 | 4/2007 | Fournier |
| 7,232,173 | B2 | 6/2007 | Katterloher et al. |
| 7,631,921 | B2 | 12/2009 | Lewis et al. |
| 7,794,007 | B2 | 9/2010 | Konet et al. |
| 7,874,610 | B2 | 1/2011 | Khalighi |
| 8,740,279 | B1 | 6/2014 | McGoff et al. |
| 9,923,294 | B1 | 3/2018 | Maranville |
| 9,956,995 | B1 * | 5/2018 | Neighbors ......... B62D 33/0273 |

(Continued)

FOREIGN PATENT DOCUMENTS

FR 2814120 A1 3/2002

*Primary Examiner* — Gregory A Blankenship
(74) *Attorney, Agent, or Firm* — Warn Partners, P.C.

(57) ABSTRACT

An articulating tailgate assembly with improved accessibility into a cargo bed of a vehicle, incorporating at least one door. The tailgate system provides a tailgate with a combination of predetermined plurality of functions for accessibility into the cargo bed of the vehicle and to improve functionality of the tailgate assembly.

8 Claims, 12 Drawing Sheets

(56) References Cited

U.S. PATENT DOCUMENTS

| | | |
|---|---|---|
| 9,988,103 B1 | 6/2018 | Mouch et al. |
| 10,023,248 B1* | 7/2018 | Harlan ............... B62D 33/0273 |
| 10,081,303 B1* | 9/2018 | Ngo ........................ B60R 3/00 |
| 10,106,208 B2* | 10/2018 | Barrios Albert .......... B60R 3/02 |
| 10,300,861 B1 | 5/2019 | Green et al. |
| 10,538,854 B2 | 1/2020 | Sakurai et al. |
| 10,994,660 B2* | 5/2021 | Ngo ................. B62D 33/0273 |
| 11,059,423 B1 | 7/2021 | Weaver |
| 11,066,111 B2* | 7/2021 | Stojkovic .......... B62D 33/0273 |
| 11,390,331 B2 | 7/2022 | Thole et al. |
| 11,427,265 B2* | 8/2022 | Williamson ....... B62D 33/0273 |
| 11,639,201 B2* | 5/2023 | Selle ...................... B62D 33/03 296/51 |
| 2002/0074817 A1* | 6/2002 | Bailey ............... B62D 33/0273 296/57.1 |
| 2005/0067851 A1 | 3/2005 | Kang et al. |
| 2008/0150311 A1 | 6/2008 | Quigley et al. |
| 2008/0277958 A1 | 11/2008 | King et al. |
| 2009/0021039 A1* | 1/2009 | Quigley .................. B60J 5/103 296/57.1 |
| 2009/0140544 A1 | 6/2009 | Pollak |
| 2009/0273202 A1* | 11/2009 | Heaman ............ B62D 33/0273 296/26.1 |
| 2010/0109368 A1 | 5/2010 | Marshall |
| 2011/0181068 A1* | 7/2011 | Zielinsky .......... B62D 33/0273 296/57.1 |
| 2015/0239372 A1 | 8/2015 | Bauer |
| 2015/0336622 A1 | 11/2015 | Worden et al. |
| 2016/0046332 A1 | 2/2016 | Mantchev |
| 2016/0214657 A1* | 7/2016 | Topolovec ........... B62D 33/027 |
| 2016/0236724 A1 | 8/2016 | Borges Filho et al. |
| 2017/0015367 A1 | 1/2017 | Baker |
| 2017/0101138 A1 | 4/2017 | Povinelli et al. |
| 2017/0274940 A1* | 9/2017 | Povinelli ............ B62D 33/0273 |
| 2017/0282979 A1* | 10/2017 | Singer .................... B62D 21/14 |
| 2017/0361878 A1* | 12/2017 | Loew ................. B62D 33/0273 |
| 2018/0086392 A1 | 3/2018 | Seki et al. |
| 2018/0195332 A1* | 7/2018 | Martins ..................... E05F 5/06 |
| 2019/0054961 A1 | 2/2019 | Ngo |
| 2019/0168658 A1 | 6/2019 | Keziah et al. |
| 2019/0185074 A1 | 6/2019 | Morley et al. |
| 2019/0301223 A1 | 10/2019 | Ihrke et al. |
| 2019/0324793 A1 | 10/2019 | Hallamaa et al. |
| 2020/0109588 A1 | 4/2020 | Nania et al. |
| 2020/0290525 A1 | 9/2020 | Viniegra |
| 2021/0039722 A1 | 2/2021 | Williamson et al. |
| 2021/0078511 A1 | 3/2021 | Ledwith et al. |
| 2021/0171128 A1 | 6/2021 | Stojkovic et al. |
| 2021/0221448 A1 | 7/2021 | Hung et al. |
| 2021/0245817 A1 | 8/2021 | Gibbs et al. |
| 2021/0253180 A1* | 8/2021 | Selle ................. B62D 33/0273 |
| 2021/0276473 A1 | 9/2021 | Carter |
| 2021/0387680 A1 | 12/2021 | Parker |
| 2022/0089227 A1 | 3/2022 | Sridhar et al. |
| 2022/0161869 A1 | 5/2022 | Nania |
| 2022/0161870 A1 | 5/2022 | Horner et al. |
| 2023/0192200 A1* | 6/2023 | Lehti ................. B62D 33/037 49/70 |
| 2023/0249760 A1* | 8/2023 | Selle ...................... B62D 33/03 296/51 |
| 2023/0256910 A1* | 8/2023 | Harmon .................... B60R 3/02 296/62 |
| 2023/0257033 A1* | 8/2023 | Harmon ............ B62D 33/0273 296/183.1 |

* cited by examiner

TAILGATE ACCESSIBILITY

CROSS-REFERENCE TO RELATED APPLICATIONS

This application is a continuation of U.S. patent application Ser. No. 17/178,642, filed Feb. 18, 2021, which claims the benefit of U.S. Provisional Application No. 62/978,089, filed Feb. 18, 2020. The disclosures of the above application are incorporated herein by reference.

FIELD OF THE INVENTION

The present invention relates to tailgate assemblies.

BACKGROUND OF THE INVENTION

Pickup cargo bed accessability is a longstanding issue. The tailgate tends to be large and, even when rotated down to the open position, typically does not improve access to the truck bed enough or typically does not include features that improve the overall functionality of the tailgate. The truck bed access is made more difficult by the size and bulk of the tailgate and the lack of access enhancing arrangements and features. In addition, pickup truck tailgates also have little functionality. They typically mainly just provide access to the bed of the pickup truck for cargo load/load, and that is substantially all that known tailgate provide.

Accordingly, there exists a need for a tailgate system that improves access into the bed of the cargo area of pickup trucks or any vehicle with a cargo bed area, provides accessories, and increases functionality of the tailgate, thereby to improve accessibility and functionality.

SUMMARY OF THE INVENTION

In accordance with the present invention, there is provided a tailgate assembly adapted for improved access to the cargo bed of pickup trucks and improves tailgate functionality. The present invention is directed to a multi-functional tailgate system integrating combinations of a plurality of features for increased access to the cargo bed or functionality of the tailgate. Integrated features include, but are not limited to, multi-functional tailgate, horizontal split gate, vertical split gate, accordion gate, side hinged, slidable (e.g., guides in tracks, step(s), seat(s), angled downward adapted for step surface(s), lighting source(s), power source(s), extendable gates, stability handle(s), and any other predetermined desired feature, etc., and any predetermined various combinations of features.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
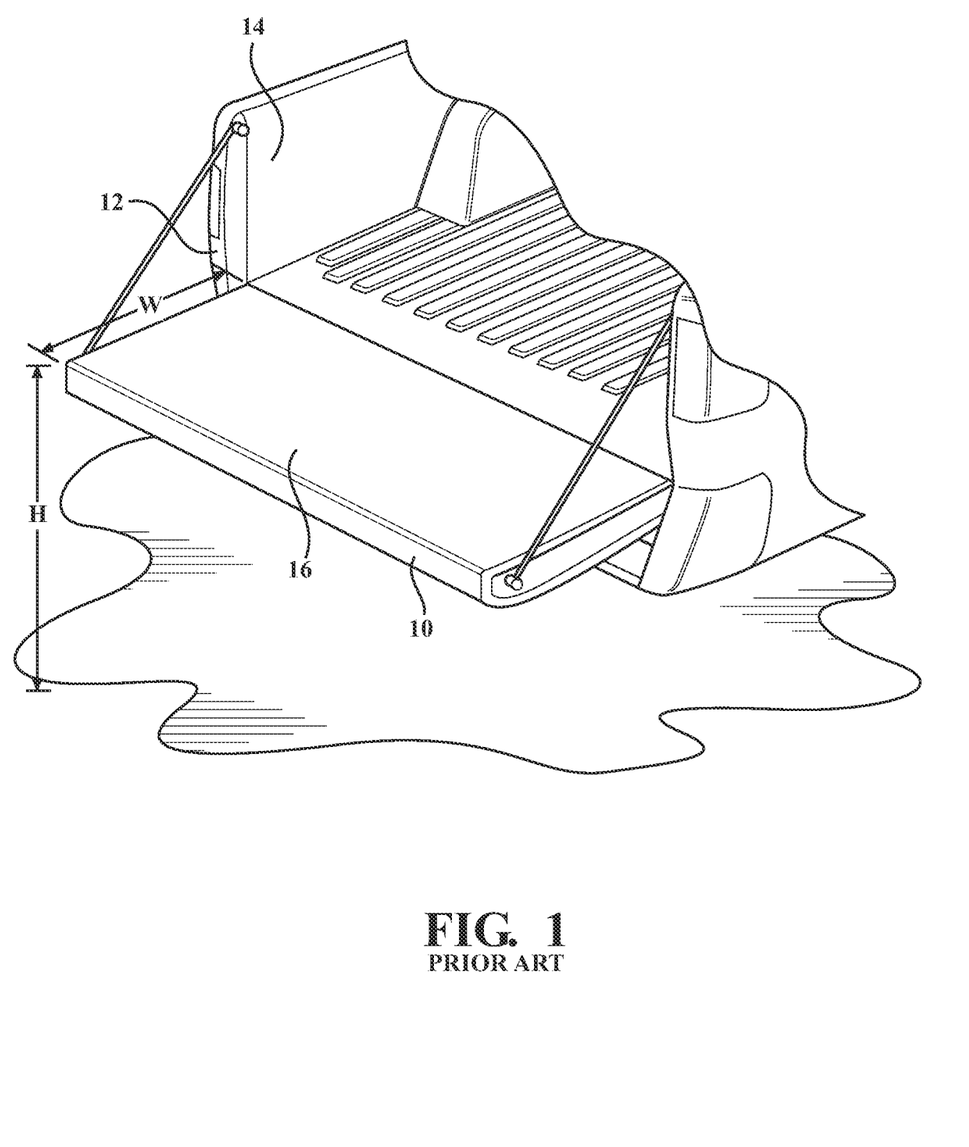
FIG. 1 is a perspective view of a conventional tailgate on a pickup truck.

FIG. 1 is a conventional tailgate 10 on a vehicle 12 providing access to the cargo bed 14 when down (down position shown in FIG. 1). Access to the bed 14 is hindered by the width W of the tailgate surface 16 and height H of the tailgate surface 16 from the ground. For bed access from the rear of the vehicle, a user needs to reach over/past the tailgate surface 16 or climb up onto the tailgate 10 into the bed 14. If the tailgate is up/closed 10, the user has to reach over bed sides or the top of the tailgate 10. There is a need for improved truck bed access.

Referring to FIGS. 2-12 generally, there is provided a tailgate assembly incorporating at least one articulating tailgate door or "gate", in accordance with the present invention.

Figure 2:
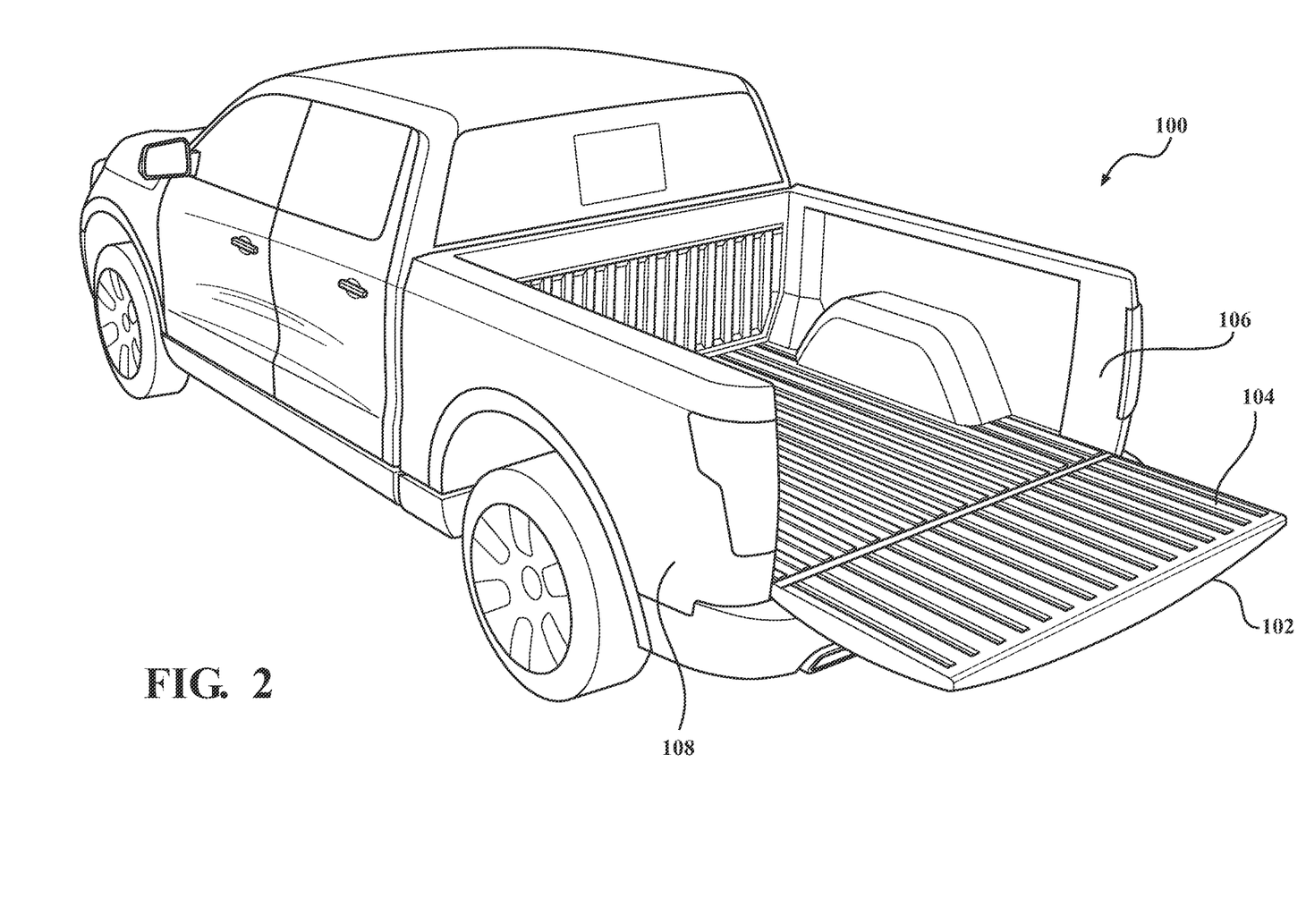
FIGS. 2-3 are perspective views of a tailgate assembly incorporating a hidden panel arrangement shown in an exemplary environment of use, in accordance with aspects of the present invention.
Figure 3:
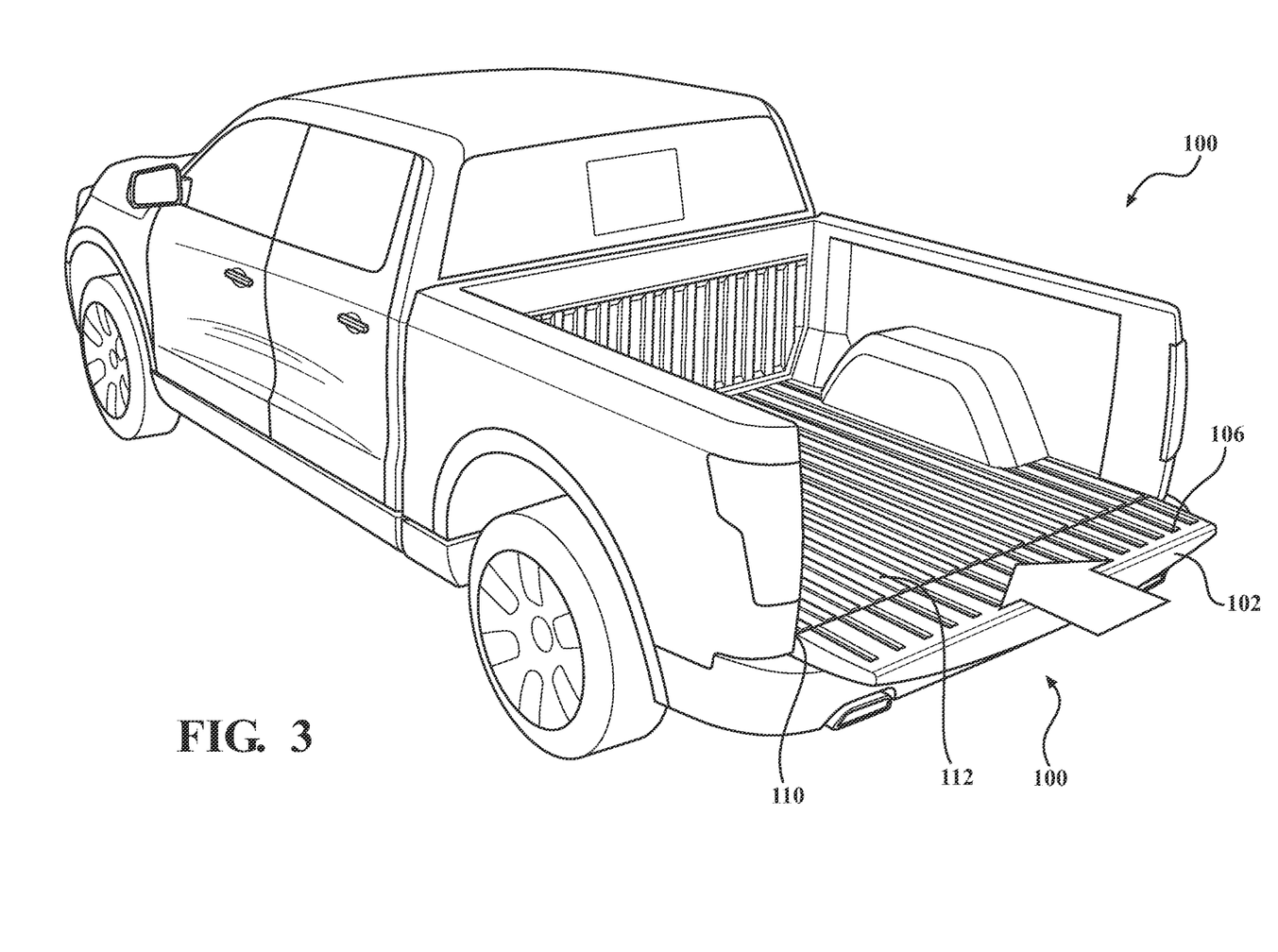

Referring now more particularly to FIGS. 2-3, there is illustrated a tailgate assembly adapted to slide into the cargo bed (as indicated by the arrow in FIG. 3). There is depicted a tailgate assembly shown generally at 100 incorporating at least one articulating tailgate door 102 or "panel", in accordance with the present invention. In the rotated down position, the tailgate surface 104 (interior face of the tailgate) allows a resting surface as well as access into the cargo bed 106 of the vehicle. For improved truck bed 106 access, however, the tailgate 102 is adapted to operably slide into at least one opening 110 (or pocket, etc) provided in the vehicle (e.g., adjacent the cargo bed surfaces, under the bottom of the cargo bed 106, into an open space below the cargo bed 106, etc).

The tailgate 102 is illustrated slid below the floor 112 of the cargo bed 106, however, it is understood that the tailgate 102 is adaptable depending on the application to slide below or behind any predetermined surface, e.g., cargo bed side walls, cargo bed floor, or any alternative suitable location.

One door 102 is shown, but it is understood that at least two tailgate panels 102,102 can be provided that selectively open/close and slide either independently or together or optionally selectively connectable together, e.g., with a latch, plunger, etc., to open/close or slide together.

At least one track or any other predetermined suitable sliding device is contemplated.

Optionally, the assembly 100 includes at least one locking mechanism (e.g., plunger(s) into a tab(s), plunger(s) into aperture(s), rotating tab(s), link(s), linkage assembly(ies), releasable plunger(s) in a track(s), etc.) to maintain the panel 102 in the down position (e.g., FIG. 2), that when selectively released allows said panel 102 to be slid, is contemplated without departure from the scope of the present invention.

The panel 102 is operably rotatably and releasably operably coupled to the vehicle adjacent the opening to rotate the tailgate to the first down/open position (e.g., incorporating hinge(s), link(s), linkage assemblies, etc. and combinations thereof).

Any other accessories and combinations thereof are contemplated depending on the application without departure from the scope of the application.

Figure 4:
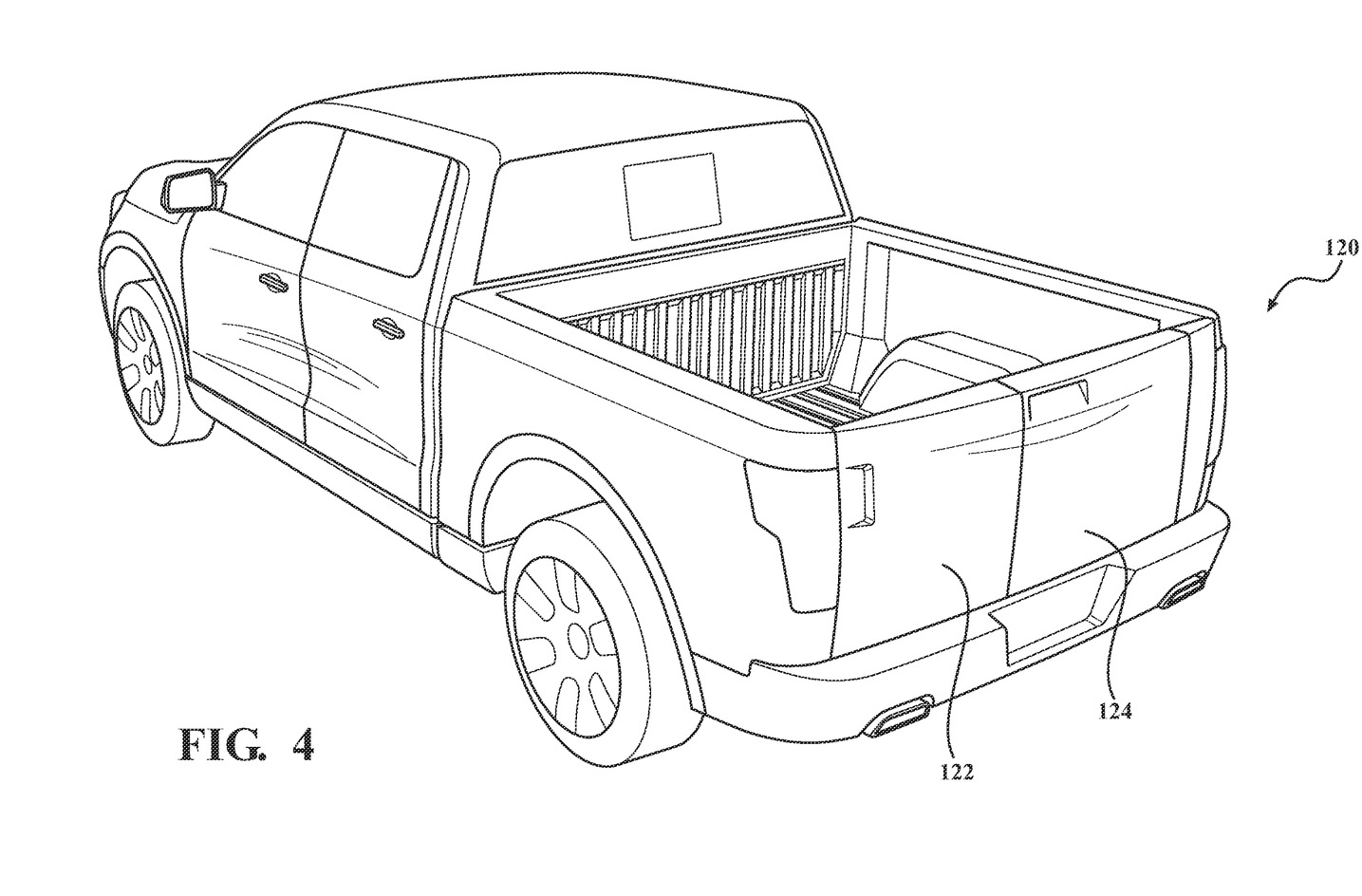
FIGS. 4-5 are perspective views of a tailgate assembly incorporating accordion panels shown in an exemplary environment of use, in accordance with aspects of the present invention.
Figure 5:
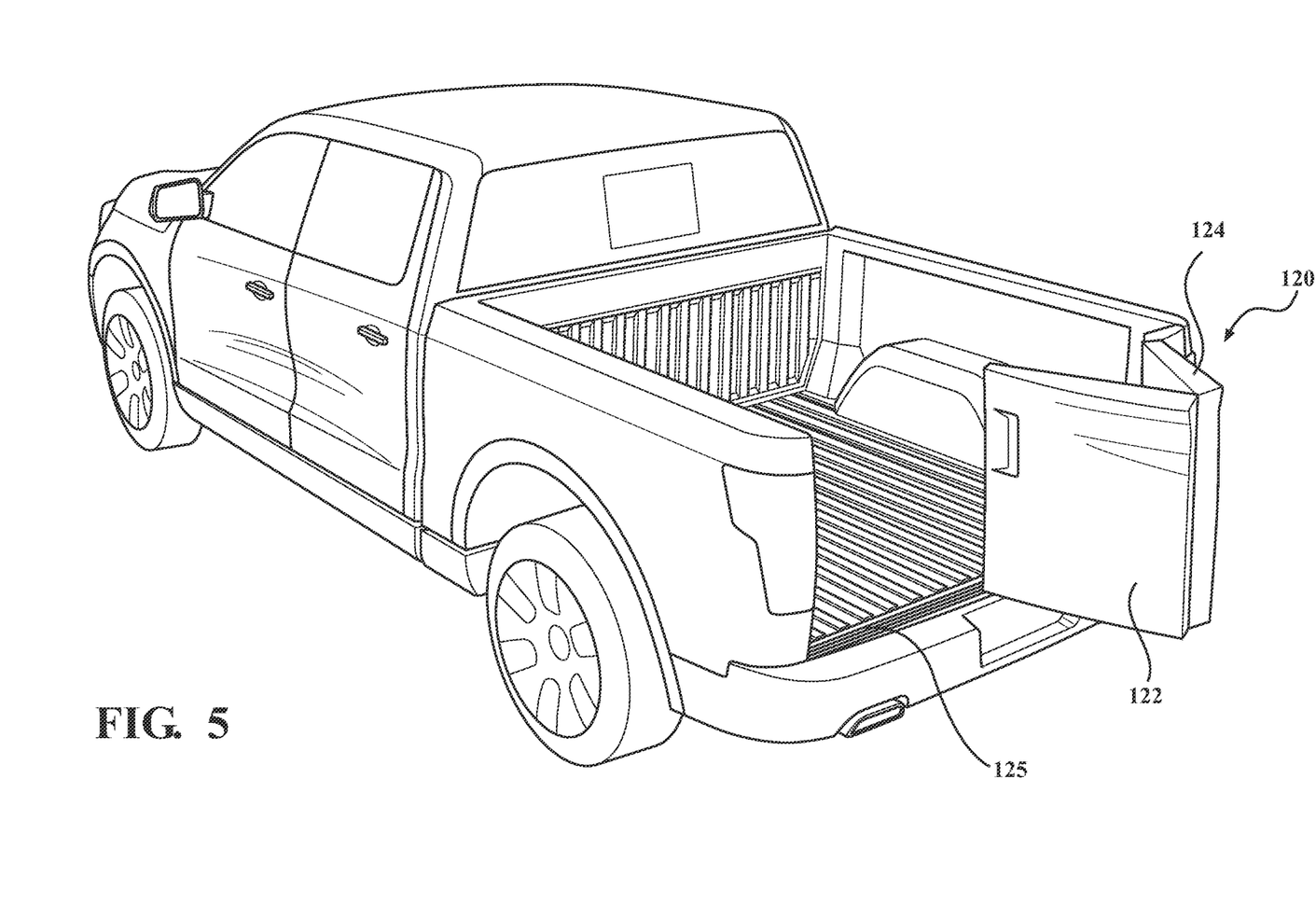

Referring now more particularly to FIGS. 4-5, there is illustrated a split tailgate shown generally at 120 with at least a first panel 122 and a second panel 124 that accordion together in a first or second direction to bring the tailgate 120 to at least one side of the cargo bed rear opening, according to aspects of the present invention. Selectively moving the panels 122,124 in either direction is contemplated. While the accordion off to one side is illustrated as generally outward of the cargo bed, it is understood that alternatively, the doors are adapted to additionally, or alternatively, accordion inward into the cargo bed. Either panel is rotatably connected, e.g., hinged, to either substantially vertical side at the opening to the cargo bed, e.g, for left accordian door opening or right accordian door opening.

Preferably, at least one guide track 125 is provided on a bottom surface adjacent the cargo bed opening to operably guide the accordian doors as they collapse together off to one side substantially out of the way so that access into the cargo bed is improved. By way of non-limiting example, at least one pin, at least one roller, or any suitable guide provided on at least one door, preferably on both door bottoms 122, 124, traverses along the guide track 125 to accordian the doors together to the open position substantially off to one side in the footprint of the rear opening of the vehicle. Preferably, the guide track 125 is operably connected to or integrally formed with the opening framework or cargo bed liner.

At least one track or any other predetermined suitable sliding device, hinge(s), locations, latches etc is/are contemplated, depending on the application without departure from the scope of the present invention. Preferably, the panels 122, 124 are operably hinged together to accordion. Additionally, preferably, the first or second panel 122, 124 is operably hinged to the vehicle adjacent the opening. The at least one of the panels 122 or 124 or both of the panels 122, 124 are operably adapted to allow another opening direction, wherein the tailgate can also selectively rotate down to another open position (e.g., similar to down/open position depicted in FIG. 2).

Any other accessories and combinations thereof are contemplated depending on the application without departure from the scope of the application.

Figure 6:
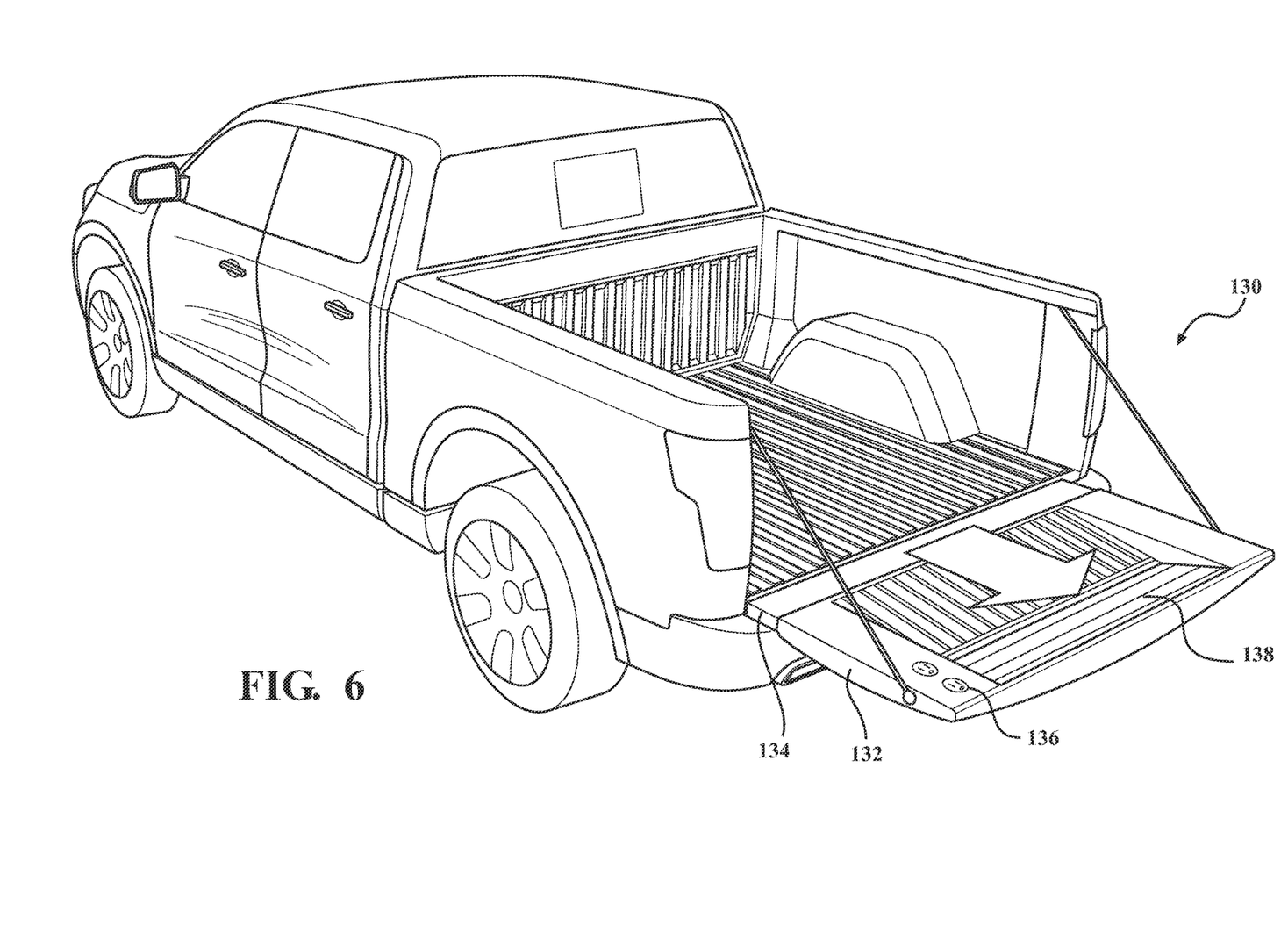
FIGS. 6-7 are perspective views of a tailgate assembly incorporating a plurality of features including an extendable tailgate forming a step shown in an exemplary environment of use, in accordance with aspects of the present invention.
Figure 7:
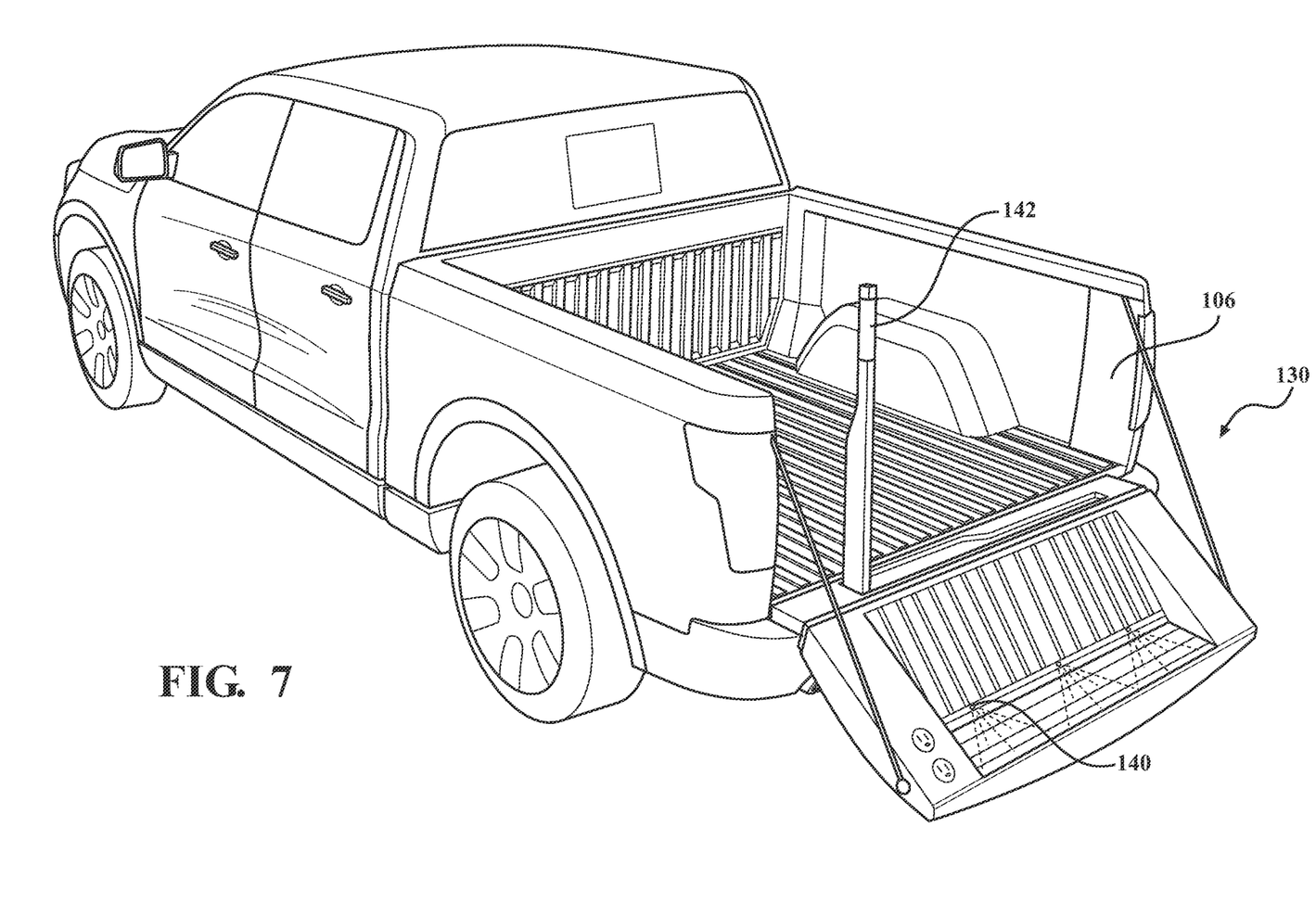

Referring now more particularly to FIGS. 6-7, there is illustrated a tailgate shown generally at 130 with at least one door 132 that operably extends out (as indicated by the arrow in FIG. 6), according to aspects of the present invention. There is provided at least one extension member 134 of predetermined width and length that is operably connected to the vehicle adjacent the opening into the rear cargo bed.

The at least one door 132 is operably coupled to the at least one extension member 134 and operable to extend outward to extend the tailgate. At least one accessory is also provided on the tailgate 130 for improved functionality. At least one power source is preferably provided 136 (e.g., 12V plug). Preferably, at least one step surface 138 is also provided. At least one lighting device 140 is preferably provided, more preferably, a lighting device 140 located in at least one predetermined location to illuminate a ground surface where an operator approaches the vehicle.

Optionally, the assembly 130 includes at least one locking mechanism (e.g., plunger(s) into a tab(s), plunger(s) into aperture(s), rotating tab(s), link(s), linkage assembly(ies), releasable plunger(s) in a track(s), etc.) to maintain the panel 132 in the down position (e.g., FIG. 6), that when selectively released allows said panel 132 to be extended, is contemplated without departure from the scope of the present invention.

To give improved access to the cargo bed 106, the tailgate 130 lowers down, e.g., at an angle preferably, to provide the step 138 access into the cab 106. A predetermined release mechanism is operably provided, e.g., at least one handle, paddle latch, etc, accessed by opening an access panel 142. The access panel 142 selectively serves as a stepping assist handle grabbed by an operator.

The tailgate 130 is operably rotatably and releasably operably coupled to the vehicle adjacent the opening to rotate the tailgate to the first down/open position (e.g., incorporating hinge(s), link(s), linkage assemblies, etc. and combinations thereof).

The tailgate 130 is operably rotatably and releasably operably coupled to the vehicle adjacent the opening to further rotate the tailgate to the second down/angled step open position (e.g., incorporating hinge(s), link(s), linkage assemblies, etc. and combinations thereof).

Any other accessories and combinations thereof are contemplated depending on the application without departure from the scope of the application.

Figure 8:
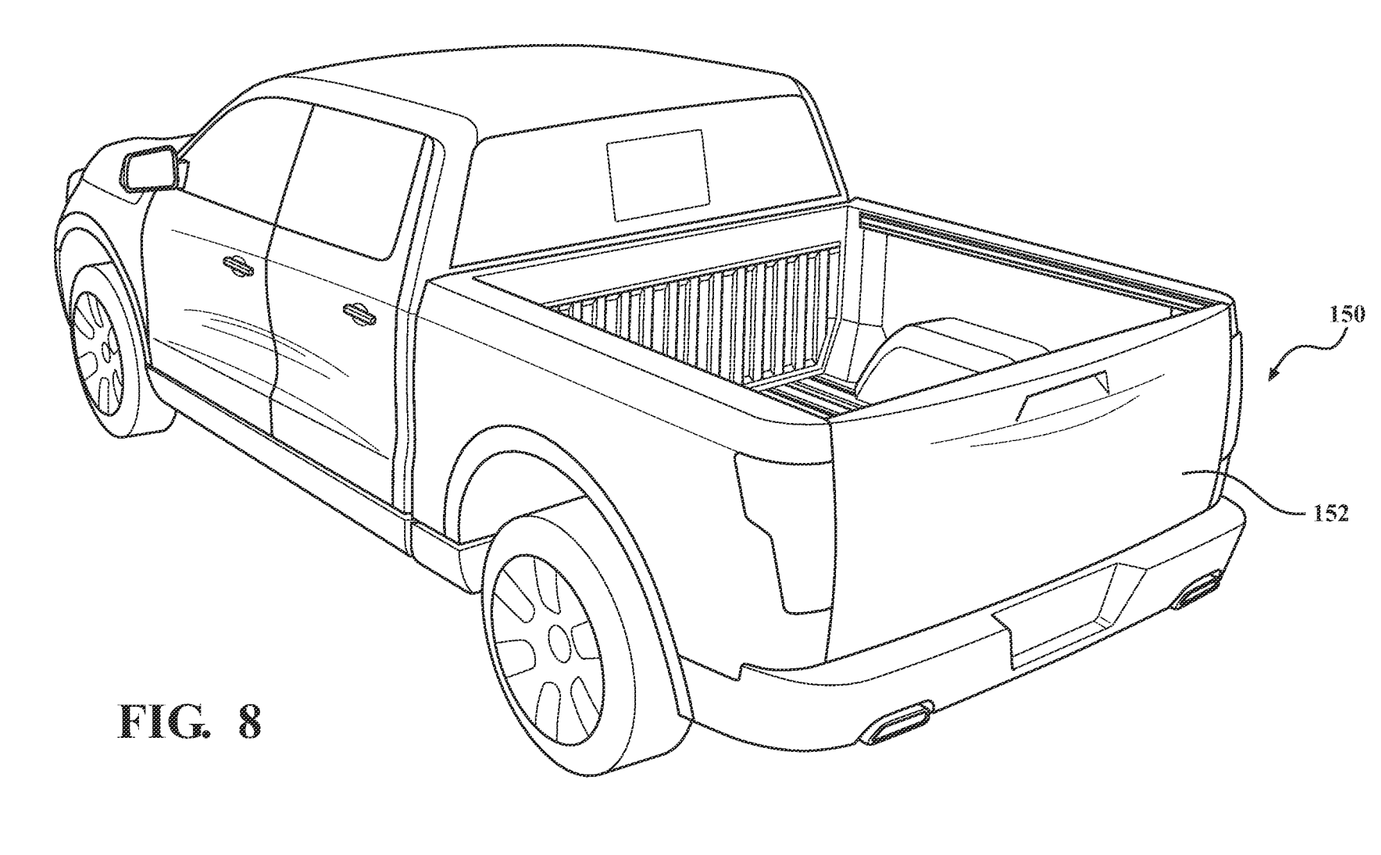
FIGS. 8-9 are perspective views of a tailgate assembly incorporating a slidable panel shown in an exemplary environment of use, in accordance with aspects of the present invention.
Figure 9:
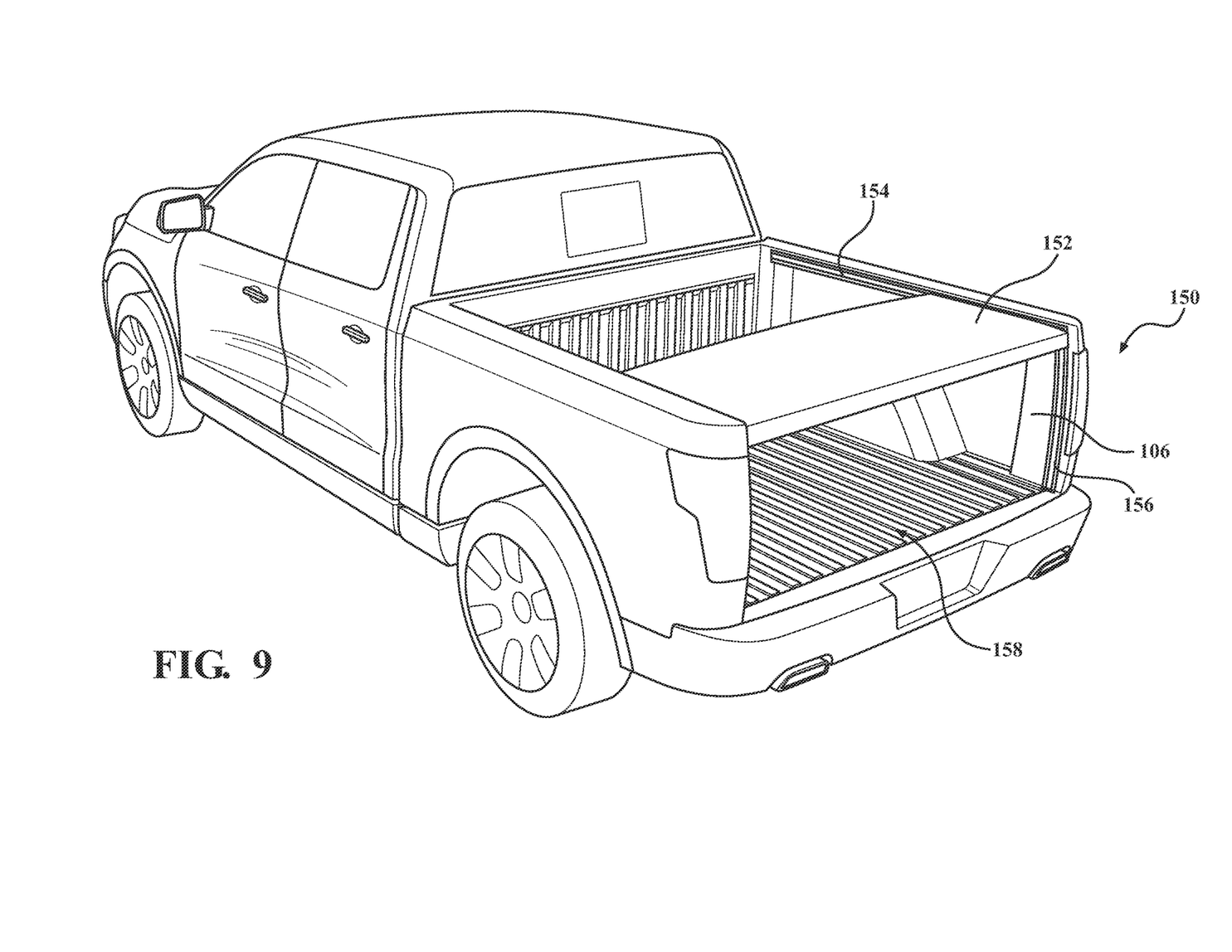

Referring now more particularly to FIGS. 8-9, there is illustrated a tailgate shown generally at 150 including at least one door 152, according to aspects of the present invention. The tailgate 150 tips up (FIG. 9) to allow improved access into the cargo bed 106. The door 152 operably traverses along at least one first pair of tracks 156 (e.g., substantially vertical tracks operably attached to, or integrally formed with, the side walls of the cargo bed 106 adjacent an opening 158 to the rear of the bed). The door 152 also operably traverses along at least one second pair of tracks 154 (e.g., substantially horizontal tracks operably attached to, or integrally formed with, the side wall uppers of the cargo bed 106 adjacent a top opening to the cargo bed. Typically, operable guides (e.g., guide rollers, guide pins, links, link assemblies, etc. and combinations thereof) are operably connected to the door 152 which operably slide along the tracks 156,154 to move the tailgate up 150 and then substantially horizontally toward the vehicle cab out of the way to increase accessibility through the rear opening 158 into the cargo bed 106.

Any other accessories and combinations thereof are contemplated depending on the application without departure from the scope of the application.

Figure 11:
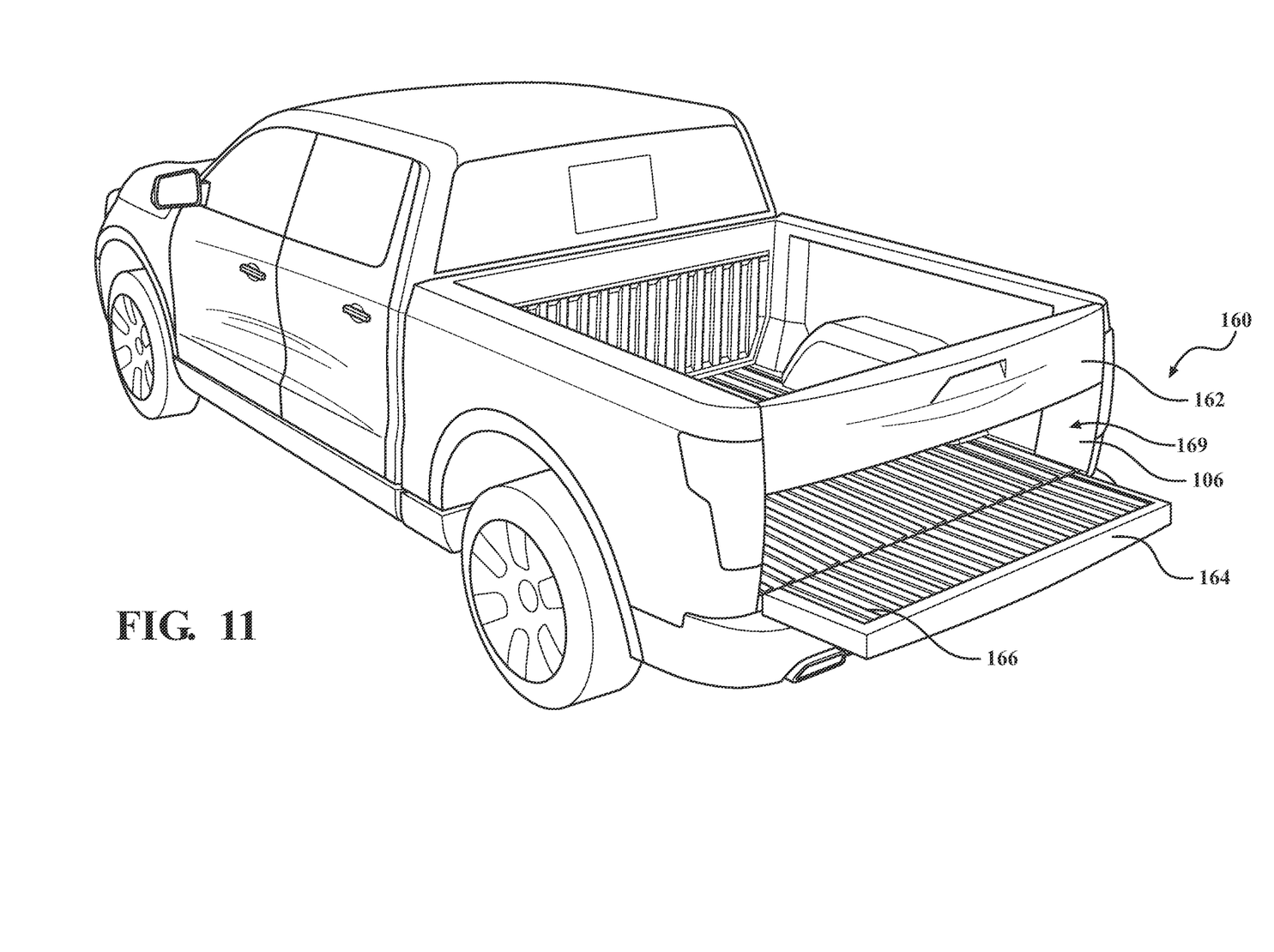
Figure 12:
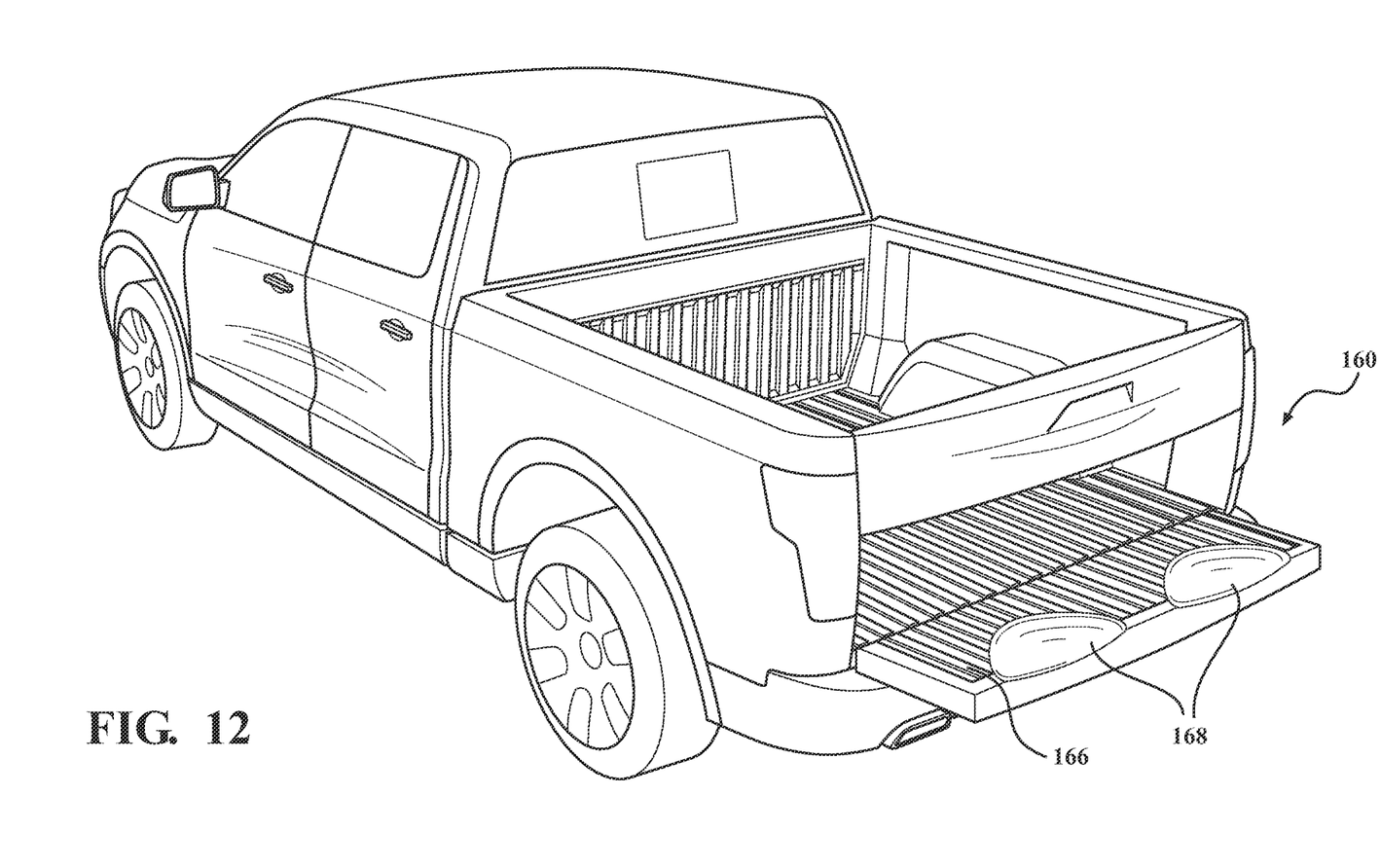
FIG. 12 is a perspective view of a tailgate assembly incorporating a horizontally split gate shown in an exemplary environment of use, in accordance with aspects of the present invention.

Referring now more particularly to FIGS. 11-12 there is illustrated a tailgate shown generally at 160 with at least two doors or "panels", a first door 162 and a second door 162, preferably half doors, according to aspects of the present invention. At least one of the doors is moveable. The gate 160 is split in half, e.g., in longitudinal, horizontal direction preferably, or alternatively vertically. The tailgate 160 being split in half makes it easier to reach through the rear opening 169 into the carbo bed 106 when the second gate 164 is opened (e.g., rotated down/open). The tailgate surface 166 is preferably relatively flat. It is understood that the door 162 can operable selectively rotate open independently or alternatively be fixed. Alternatively, the tailgate halves 162,164 are operably selectively latchable to each other to selectively open together (e.g., drop down to orientation of 164 in the figure). It is contemplated that, additionally, the first door 162 is adopted to tip up/back (similar to FIG. 9).

The tailgate halve 164 is operably rotatably and releasably operably coupled to the vehicle adjacent the opening 169 to rotate the tailgate to the first down/open position (e.g., can incorporate guides, guide rollers, guide pins, hinge(s), link(s), linkage assemblies, etc. and combinations thereof).

The tailgate 160 halves 162, 164 are operably selectively connected for a closed position. Optionally, adapted to operably rotate together down to a second open position (e.g., similar to the position depicted in FIG. 2).

Alternatively, the lower half 164 is operably rotatably coupled to the vehicle to rotate between open/closed positions, and the second half 162 (e.g., upper half) is operably slidably coupled to the vehicle to slide up and out of the way, e.g., using vertical guide tracks or vertical and upper horizontal guide tracks.

Any other accessories and combinations thereof are contemplated depending on the application without departure from the scope of the application.

Figure 10:
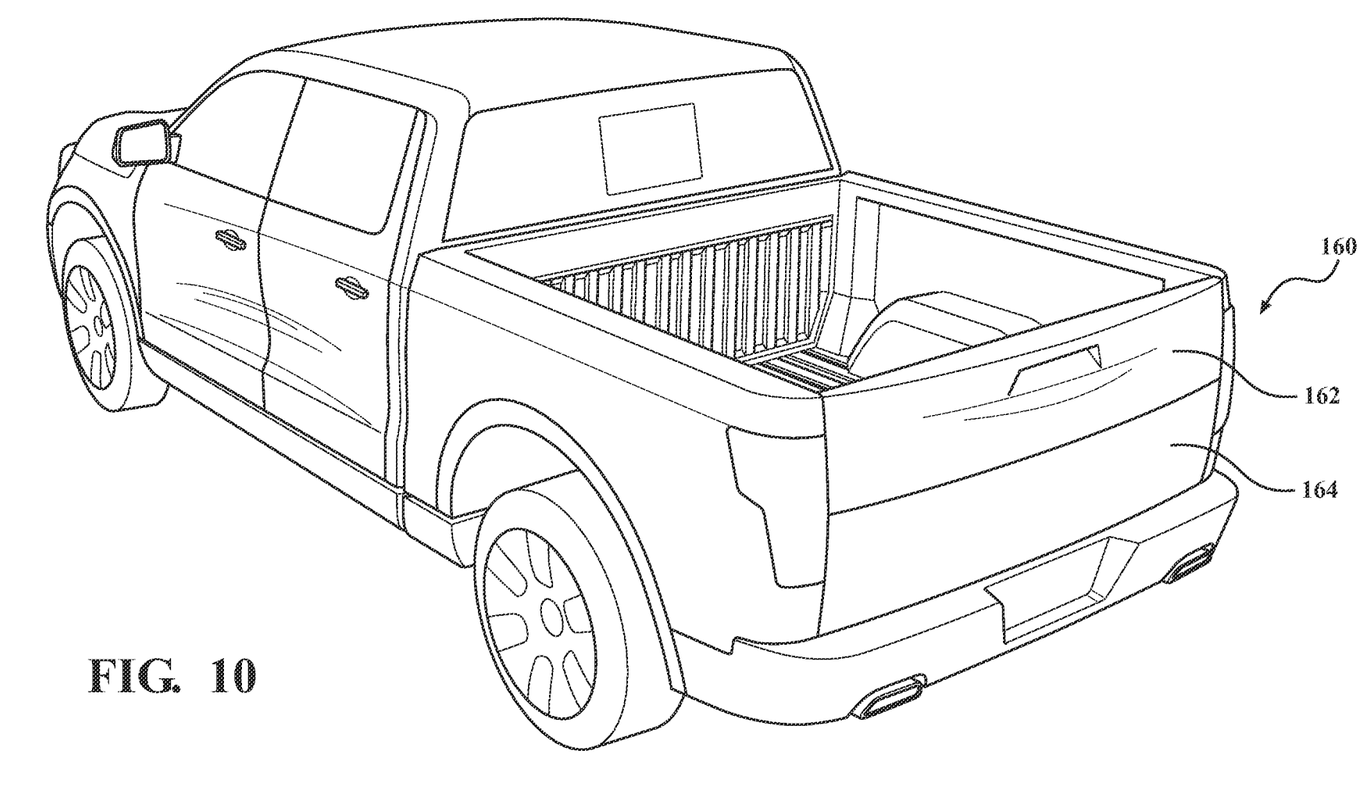
FIGS. 10-11 are perspective views of a tailgate assembly incorporating a horizontally split gate shown in an exemplary environment of use, in accordance with aspects of the present invention.

Referring now to FIG. 12, which is identical to FIGS. 10-11 except that at least one seat is provided, according to aspects of the present invention. Preferably, at least one depression is provided 168 in the tailgate surface 166 that serves as a seat for a person.

Any other accessories and combinations thereof are contemplated depending on the application without departure from the scope of the application.

Any of the aforementioned aspects of the present invention are understood to be adaptable to be combinable in any combination. Any of the aforementioned FIGS. 2-12 materials are metal, aluminum, composite, SMC, reinforced, steal, and any combinations thereof. Any of the aforementioned aspects of the present invention of FIGS. 2-12 or described are understood to be adaptable to be combinable with each other and any accessories and combinations thereof are contemplated depending on the application without departure from the scope of the application. Any of the aforementioned aspects of the present invention are understood to be adaptable to incorporate at least one lift assist. Any of the aforementioned aspects of the present invention are understood to be adaptable to incorporate at least one manual, mechanical, or electrical lift assist. The tailgate assembly incorporates at least one improved assessability feature, e.g., at least one door pocket system, accordian tailgate system, tailgate step system, tailgate track system, tailgate tip system, split tailgate system, horizontal split tailgate system and combinations thereof. Preferably, in combination with improved accessability and functionality features including, but not limited to, step-up surfaces, lighting, power sources, independently articulatable doors, etc. and any combinations thereof.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tailgate assembly, comprising:
   at least one tailgate door adapted to operably connect at an opening of a cargo bed of a vehicle, said at least one tailgate door operably selectively moveable between a closed position and a plurality of open positions, wherein said tailgate assembly is adapted to operably extend said at least one tailgate door;
   at least one feature incorporated with said at least one tailgate door adapted for improved access to the cargo bed of the vehicle;
   at least one extension member adapted to operably coupled to the vehicle and operably coupled to said at least one tailgate door to selectively operably extend said at least one tailgate door rearward; and
   a stepping access handle embedded in said at least one extension member, wherein said stepping access handle is selectively operably deployable for an operator to use.

2. The tailgate assembly of claim 1, wherein said at least one feature is selected from the group consisting of a tailgate step system, tailgate tip system, stepping assist, and combinations thereof.

3. The tailgate assembly of claim 1, wherein the at least one tailgate door is adapted to rotatably connect to a substantially vertical side of the opening of the vehicle.

4. The tailgate assembly of claim 1, further comprising at least one guide track located adjacent to the opening to selectively operably guide the at least one tailgate door to at least one open position.

5. The tailgate assembly of claim 1, wherein the tailgate assembly further comprises at least one accessory selected from the group consisting of at least one power source, at least one stability handle, at least one lighting source, and any combinations thereof.

6. The tailgate assembly of claim 1, wherein the at least one tailgate door is adapted to operably slide out from the vehicle to extend a length of the at least one tailgate door.

7. The tailgate assembly of claim 6, wherein said tailgate assembly comprises an integrated step portion with an operator stepping surface, wherein the at least one liftgate door is additionally selectively operably rotatable to a downward angled step position operable for said stepping surface to provide a step for an operator.

8. The tailgate assembly of claim 6, wherein said step portion comprises a depression formed in said at least one tailgate door.

* * * * *